United States Patent
Benesh (10) Patent No.: US 10,274,733 B2
(45) Date of Patent: Apr. 30, 2019

(54) HELMET SYSTEM HAVING ADJUSTABLE LIGHT TRANSMISSION

(71) Applicant: Elbit Systems Ltd., Haifa (IL)

(72) Inventor: Gil Benesh, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 15/517,124

(22) PCT Filed: Oct. 6, 2015

(86) PCT No.: PCT/IL2015/050989
§ 371 (c)(1),
(2) Date: Apr. 5, 2017

(87) PCT Pub. No.: WO2016/055999
PCT Pub. Date: Apr. 14, 2016

(65) Prior Publication Data
US 2017/0242253 A1 Aug. 24, 2017

(30) Foreign Application Priority Data
Oct. 7, 2014 (IL) .......................................... 235088

(51) Int. Cl.
*G02B 27/01* (2006.01)
*B64D 43/00* (2006.01)
*G02F 1/01* (2006.01)

(52) U.S. Cl.
CPC ......... *G02B 27/0172* (2013.01); *B64D 43/00* (2013.01); *G02B 2027/0118* (2013.01); *G02F 1/0126* (2013.01)

(58) Field of Classification Search
CPC ........ G02B 27/0172; G02B 2027/0118; B64D 43/00; G02F 1/0126
See application file for complete search history.

(56) References Cited

U.S. PATENT DOCUMENTS 4,449,787 A 5/1984 Burbo et al.
5,271,580 A * 12/1993 Speelman .................. B60J 3/04
244/121

(Continued)

FOREIGN PATENT DOCUMENTS

DE 1772014 A1 6/1970
EP 0066402 A1 12/1982

(Continued)

OTHER PUBLICATIONS

Office Action dated Mar. 9, 2015 for Israeli Patent Application No. 235088 (6 Pages).

(Continued)

*Primary Examiner* — Ibrahim A Khan
(74) *Attorney, Agent, or Firm* — Brown Rudnick LLP (57) ABSTRACT

A HMD system including a visor mounted on a head of a user. The visor includes adjustable light transmission layer activated by activation radiation of at least a visible activation waveband and an Ultra Violet (UV) activation waveband. The visor defines a Line Of sight (LOS) projecting from a point on the visor and further defines a Field Of View (FOV) projecting from at least a section of the visor that surrounds the point on the visor. The visor is configured to admit an outside scene image. The HMD system further includes a luminosity sensor configured to detect luminosity within the FOV and a UV activation radiation source configured to selectively irradiate at least a portion of the visor with activation UV light included in the UV activation waveband according to luminosity detected by the luminosity sensor, thereby activating the adjustable light transmission layer.

14 Claims, 4 Drawing Sheets

(56) References Cited

U.S. PATENT DOCUMENTS

| | | |
|---|---|---|
| 5,640,711 A | 6/1997 | Lefort et al. |
| 5,835,277 A | 11/1998 | Hegg |
| 5,841,408 A | 11/1998 | Rickard |
| 6,008,946 A | 12/1999 | Knowles |
| 6,049,367 A | 4/2000 | Sharp et al. |
| 7,893,890 B2 | 2/2011 | Kelly et al. |
| 8,487,233 B2 | 7/2013 | Baudou et al. |
| 2002/0071185 A1* | 6/2002 | Chretien ............... G02B 5/20 359/629 |
| 2002/0148032 A1* | 10/2002 | Basson ............... A42B 3/042 2/422 |
| 2002/0171940 A1* | 11/2002 | He ............... G02B 27/01 359/630 |
| 2003/0169213 A1* | 9/2003 | Spero ............... G02B 5/20 345/7 |
| 2004/0185268 A1 | 9/2004 | Kumar et al. |
| 2004/0246437 A1 | 12/2004 | Ambler et al. |
| 2008/0218434 A1* | 9/2008 | Kelly ............... G02B 27/01 345/8 |
| 2008/0239452 A1* | 10/2008 | Xu ............... G02C 7/101 359/265 |
| 2010/0053030 A1 | 3/2010 | Sprague |
| 2010/0132085 A1* | 6/2010 | Beaudet ............... A42B 3/221 2/6.5 |
| 2011/0209319 A1* | 9/2011 | Williams ............... B64C 1/1492 29/402.01 |
| 2011/0240834 A1* | 10/2011 | Baudou ............... G02B 27/01 250/214 AL |
| 2011/0283431 A1* | 11/2011 | Miller, IV ............... A42B 3/226 2/10 |
| 2012/0075168 A1* | 3/2012 | Osterhout ............... G02B 27/017 345/8 |
| 2012/0327051 A1* | 12/2012 | Davies ............... G09G 5/10 345/207 |
| 2014/0111864 A1* | 4/2014 | Margulis ............... G02B 27/0172 359/630 |
| 2014/0272468 A1 | 9/2014 | DeMeio et al. |
| 2015/0092083 A1* | 4/2015 | Lam ............... G02B 27/017 348/234 |
| 2016/0187650 A1* | 6/2016 | Mills ............... A42B 3/042 345/8 |

FOREIGN PATENT DOCUMENTS

| | | |
|---|---|---|
| EP | 2312373 A1 | 4/2011 |
| GB | 2155762 A | 10/1985 |
| GB | 2161121 A | 1/1986 |
| IL | 213727 A | 1/2015 |
| JP | 2009092807 A | 4/2009 |
| JP | 2009092808 A | 4/2009 |
| WO | 2012176201 A1 | 12/2012 |
| WO | 2013123592 A1 | 8/2013 |

OTHER PUBLICATIONS

English Translation of Office Action dated Mar. 9, 2015 for Israeli Patent Application No. 235088 (6 Pages).
Office Action Response Filed Jul. 8, 2015 for Israeli Patent Application No. 235088 (2 Pages).
English Translation of Office Action Response Filed Jul. 8, 2015 for Israeli Patent Application No. 235088 (2 Pages).
Office Action dated Feb. 2, 2016 for Israeli Patent Application No. 235088 (4 Pages).
English Translation of Office Action dated Feb. 2, 2016 for Israeli Patent Application No. 235088 (6 Pages).
Office Action Response Filed May 24, 2016 for Israeli Patent Application No. 235088 (4 Pages).
English Translation of Office Action Response Filed May 24, 2016 for Israeli Patent Application No. 235088, Including Amended Claims (8 Pages).
Office Action dated Dec. 29, 2016 for Israeli Patent Application No. 235088 (4 Pages).
English Translation of Office Action dated Dec. 29, 2016 for Israeli Patent Application No. 235088 (5 Pages).
Office Action Response Filed Feb. 27, 2017 for Israeli Patent Application No. 235088 (1 Page).
English Translation of Office Action Response Filed Feb. 27, 2017 for Israeli Patent Application No. 235088 (1 Page).
Notice of Allowance dated Mar. 16, 2017 for Israeli Application No. 235088 (2 Pages).
English Translation of Notice of Allowance dated Mar. 16, 2017 for Israeli Application No. 235088 (2 Pages).
Priority Application IL 235088 as Allowed by the Israeli Patent Office (31 Pages).
International Search Report and Written Opinion of the International Searching Authority dated Feb. 4, 2016 for International Application No. PCT/IL2015/050989 (8 Pages).
Extended European Search Report dated Jan. 26, 2018 for European Application No. 15848479.0 (9 Pages).

* cited by examiner

HELMET SYSTEM HAVING ADJUSTABLE LIGHT TRANSMISSION

FIELD OF THE DISCLOSED TECHNIQUE

The disclosed technique relates to head mounted display [HMD] systems, in general, and to HMD systems, which visor has an adjustable light transmission, in particular.

BACKGROUND OF THE DISCLOSED TECHNIQUE

The visor of a helmet may be a tinted visor (i.e., a shaded visor), having lower light transmission than a clear visor. Such tinted visor reduces the brightness of the ambient light arriving at the users eye, in order to provide the user with a better view in bright conditions. The degree of transmission or alternatively the transmission of certain wavelengths may vary from visor to visor. Furthermore, the transmission of the visor may be adjustable and controllable, automatically or manually. Additionally, the visor can include several areas, each having a respective light transmission. Moreover, one or more areas of the visor can have adjustable and controllable light transmission.

U.S. Pat. No. 8487,233B2 issued to Baudou et al., entitled "Vision Equipment Comprising an Optical Strip with a Controlled Coefficient of Light Transmission" is directed to a vision system having a controlled light transmission optical strip. This publication describes a vision equipment system of a helmet of a pilot including a visor (40), an image projection device (45) and a plurality of UV LEDs (41, 42, 43 and 44). Visor 40 includes several portions of adjustable light transmission (46, 47 and 48). The adjustable light transmission portions are activated by the UV LEDs according to measured luminosity levels. The image projection device of this publication projects the image onto the inner side of the visor such that the projected image does not pass via the visor, but is reflected therefrom toward the eye of the user.

U.S. Pat. No. 5,640,711 issued to Lefort et al. entitled "Head-mounted visor with variable transmission", is directed to a head-mounted visor having at least two zones with different values of absorption of light. The visor includes two functionally different zones. One zone has a higher absorption, and corresponds to the wearer's visual field of the outside scene. Another has a lower absorption, and corresponds to the view of the dashboard instruments.

U.S. Pat. No. 7,893,890 issued to Kelly et al. and entitled "Electrically dimmable combiner optics for head-up display", is directed to a system for providing head-up displays with variable light transmission. The system includes a combiner and a projector, wherein the projector projects an image onto the combiner. Alternatively, the combiner may have an internally integrated display module. The system also includes a light sensor, which detects the light intensity outside the cockpit portion. The light sensor transfers this information to an operatively coupled combiner control device coupled with the combiner. The control device adjusts the transmission of the combiner after receiving information relating to ambient the light intensity. Further alternatively, the operator may manually control the transmission of the combiner.

The combiner may include one or more segments to provide varying levels of transmission of light. For example, the combiner may be divided vertically, horizontally, or both, to create segments of the combiner. Additionally, the combiner may be wearable, for example in the form of a visor attached to a helmet.

SUMMARY OF THE PRESENT DISCLOSED TECHNIQUE

It is an object of the disclosed technique to provide a novel method and system for displaying an image on a Helmet Mounted Display (HMD) system while adjusting the light transmission properties of the visor of the HMD system. In accordance with an embodiment of the disclosed technique, there is thus provided an HMD system including a visor, a luminosity sensor, and a UV activation radiation source. The visor is mounted on a head of a user. The visor includes an adjustable light transmission layer activated by activation radiation including at least a visible activation waveband and an Ultra Violet (UV) activation waveband. The visor defines a Line Of sight (LOS) projecting from a point on the visor, and defines a Field Of View (FOV) projecting from at least a section of the visor that surrounds that point. The luminosity sensor is configured to detect luminosity within the FOV. The UV activation radiation source is configured to selectively irradiate activation UV light according to luminosity detected by the luminosity sensor. The HMD system is located in a UV-attenuated environment such that the adjustable light transmission layer is activated by activation ambient light in the visible activation waveband, and can further be activated by activation UV light emitted from the UV activation radiation source.

In accordance with another embodiment of the disclosed technique, there is thus provided a method for operating an HMD system. The method includes the steps of determining a FOV of the HMD system, measuring luminosity within the FOV, determining a desired light transmission level, and irradiating UV activation radiation on the visor of the HMD. The luminosity is measured within the FOV of the visor of the HMD by employing a luminosity sensor. The irradiated UV activation radiation induces the desired light transmission level of the visor.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a HMD system with a visor including a layer of adjustable and controllable light transmission. The adjustable light transmission layer (also referred to herein simply as the adjustable layer) of the visor of the disclosed technique can be activated at least by light wavelengths within the UV spectrum.

The HMD system of the disclosed technique can be employed, for example, by pilots in aircrafts. In many aircraft,s the windows of the cockpit include an Ultra Violet (UV) blocking layer, for blocking, or at least attenuating, UV portions of the ambient light entering the cockpit. Thus, the cockpit can be considered as a UV-free environment (or at least a UV-attenuated environment). The UV wavelengths employed for controlling the light transmission of the adjustable layer are within the attenuated UV spectrum. Additionally, the adjustable layer may further be activated by unattenuated light wavelengths (e.g., visible light wavelengths) included in ambient light. It is noted that the HMd system can be employed in other UV attenuated environments besides aircraft cockpits.

It is noted that the visor of the HMD system is associated with a Field of View (FOV) of the HMD, projecting from an area of the visor (i.e., the FOV area). The visor is further associated with a Line of Site (LOS) of the HMD projecting from a respective point of the visor, located within the FOV area of the visor. Thus, one can determine the FOV of the HMD by determining the LOS of the HMD, and vice versa. Therefore, the terms LOS and FOV may be interchangeably used throughout the application. Generally, the LOS is determined by a respective sensor (e.g., an orientation sensor), and the FOV is derived therefrom.

In accordance with an embodiment of the disclosed technique, the adjustable transmission HMD system further includes a UV radiation source, a controller, a LOS sensor, and a luminosity sensor. The controller is coupled with each of the UV radiation source, the LOS sensor and the luminosity sensor, for controlling and coordinating the operation thereof. The LOS sensor determines the LOS of the HMD. The luminosity sensor determines the luminosity levels within the FOV of the HMD. The controller controls the UV radiation source for activating the adjustable layer according to the determined luminosity within the FOV of the HMD. In case the luminosity sensor and the UV radiation source are mounted on the HMD, and are aligned with the FOV of the HMD, the LOS sensor can be omitted from the adjustable transmission HMD system.

In accordance with another embodiment of the disclosed technique, the adjustable layer is controlled by two activation light wavebands (dual activation). In particular, one of the activation wavebands is visible, and the other activation waveband is within the UV spectrum. As mentioned above, visible light can penetrate the cockpit, while UV light cannot (or at least is attenuated when penetrating the cockpit). Thus, ambient light can serve as the visible light activation source. In this manner, the light transmission of the adjustable layer of the visor is automatically and uncontrollably adjusted according to the ambient light impinging on the visor. That is, the adjustable layer is automatically activated, and the light transmission thereof is adjusted by the ambient light without intervention of the controller component or the user. Additionally, in case of a special need, the adjustable layer can further be activated by the adjustable transmission HMD system via the UV radiation source. For instance, in case the user provides appropriate instructions via an input interface.

The dual activation wavebands can be, for example, two adjacent wavebands (i.e., adjacent along the electromagnetic radiation spectrum) lying on either side of the UV/visible light border. That is, the activation wavebands are a deep blue waveband (i.e., located at the end of the visible spectrum close to the UV spectrum), and a near UV waveband located at the end of the UV spectrum close to the visible spectrum. Deep blue ambient light can penetrate the cockpit and serve as the visible light activation source. Near UV ambient light cannot penetrate the cockpit (or at least is attenuated when penetrating the cockpit), and the near UV radiation source is employed for activating the adjustable layer in case of a special need. Alternatively, any two other wavebands, one visible and one UV can be employed for activation of the adjustable layer. Further alternatively, the visor includes two adjustable layers, one activated by visible radiation and the other by UV radiation.

Figure 1:
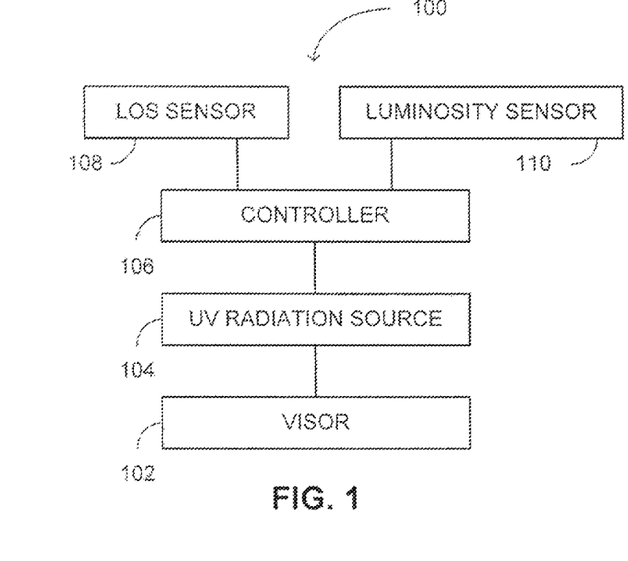
FIG. 1 is a schematic illustration of a block diagram of an adjustable light transmission HMD system, constructed and operative in accordance with an embodiment of the disclosed technique.

Reference is now made to FIG. 1, which is a schematic illustration of a block diagram of an adjustable light transmission HMD system, generally referenced 100, constructed and operative in accordance with an embodiment of the disclosed technique. Adjustable light transmission HMD system 100 (i.e., HMD system 100) includes a visor 102 including an adjustable light transmission layer (not shown), an Ultra Violet (UV) radiation source 104, a controller 106, a Line of Site (LOS) sensor 108, and a luminosity sensor 110. UV radiation source is optically coupled with visor 102. That is, UV radiation source can project UV radiation onto at least a portion of visor 102 for activating the adjustable layer thereof. Controller 106 is coupled with UV radiation source 104, LOS sensor 108 and with luminosity sensor 110.

System 100 is mounted on the head of a user (i.e., a head mounted system), for example, by a head strip, a helmet or any other head mount. Alternatively only some of the components of system 100 are mounted on the head of the user, while other components are positioned in the surrounding vicinity. For example, the visor, the radiation source and the luminosity sensor are mounted on a helmet of a pilot, while the processor is positioned in a cockpit of an airplane.

In accordance with an embodiment of the disclosed technique, HMD system 100 is located within a cockpit of an aircraft (both not shown). The windows of the cockpit block (or at least attenuate) UV radiation. Visor 102 includes an adjustable light transmission layer that can be controlled via electromagnetic radiation (e.g., photochromic layer activated by light). For example, visor 102 can be coated with a photochromic layer, can be coupled to a photochromic layer or can be made entirely from a photochromic material. Other examples of a photochromic visor are visors at which the photochromic material is embedded into or otherwise integrated into. For example, the visor can include liquid crystal bubbles containing photochromic particles. The adjustable layer of visor 102 is activated by at least one activation waveband of light, including at least some wavelengths lying in the UV portion of the spectrum (i.e., UV light). Additionally, the activation wavebands of the adjustable layer can include visible wavelengths.

It is noted that the adjustable layer of visor 102 can be made to occupy only a portion of visor 102 (e.g., a portion or a patch of visor 102). In this manner, the light transmission of some portions of the visor 102 is constant and cannot be adjusted, while the light transmission of the patch including the adjustable layer, can be adjusted and controlled. Moreover, visor 102 can include several patches, each including a respective adjustable layer, such that the light transmission of different portions of visor of 102 can be controlled separately. Each such adjustable patch can be activated by the same wavebands, or by unique wavebands. In such cases, HMD system 100 can include several UV radiation sources 104 for activating each of the adjustable patches.

UV radiation source 104 can be any light source producing UV light (i.e., UV radiation). For example, UV radiation source 104 is a UV LED 104, or a plurality of UV LEDs 104. Controller 106 can be any device that can coordinate the operation of the sensors of HMD system 100, receive data from the sensors, and that can accordingly control the operation of UV radiation source 104. For example, controller 106 is a processing device or a network of processing devices.

LOS sensor 108 can be any device that can determine the LOS of the HMD, or that can acquire readings that would allow controller 106 to determine the LOS of the HMD. LOS sensor 108 can be mechanical sensor, optical sensor, electromagnetic sensor, ultrasonic sensor, or any other LOS sensor, or orientation sensor, known in the art. Luminosity sensor 110 can be any device that can determine luminosity levels, or light intensity, at a respective FOV. Luminosity sensor 110 measures the luminosity at a respective light spectrum. In accordance with an embodiment of the disclosed technique, the luminosity sensor spectrum includes at least the visible activation wavebands of the adjustable layer of visor 102. Alternatively, the luminosity detection spectrum can include any wavebands, whether including the activation wavebands or not.

During operation of HMD system 100, LOS sensor 108 acquires readings respective of the LOS of the HMD on which visor 102 is installed. LOS sensor 108 either determines the LOS of the HMD and provides the LOS to controller 106, or provides the acquired readings to controller 106 that determines the LOS of the HMD by itself. Controller 106 determines the FOV of the HMD according to the LOS of the HMD. Controller 106 instructs luminosity sensor 110 to measure the luminosity within the FOV of the HMD. Luminosity sensor 110 measures the luminosity and provides the readings back to controller 106.

In accordance with one embodiment of the disclosed technique, the adjustable layer of visor 102 is activated solely by UV radiation. Controller 106 determines a desired light transmission level of the adjustable layers (i.e., of visor 102) according to the measured luminosity level. Accordingly, controller 106 operates UV radiation source 104 to project UV radiation onto visor 102 for inducing the desired light transmission levels in visor 102. As the cockpit can be considered as a UV-free environment, the adjustable layer is only activated when UV radiation source irradiates visor 102.

In accordance with another embodiment of the disclosed technique, the adjustable layer is activated by two activation wavebands, a visible waveband and a UV waveband. For example, the adjustable layer is activated by a waveband located on the border between the visible spectrum and the UV spectrum, which includes both visible wavelengths (e.g., deep blue wavelengths), and UV wavelengths (near UV wavelengths). Thereby, the adjustable layer is affected by the deep blue wavelengths of the ambient light penetrating the cockpit. The adjustable layer is adapted to reach a predetermined desired level of light transmission by the ambient light deep blue wavelengths. In this manner, the adjustable layer is automatically and uncontrollably activated without interference of controller 106 or of the user.

Additionally, controller 106 can complement (or replace) the activation of the adjustable layer by ambient light with activation by UV light. Controller 106 operates UV radiation source 104 to activate the adjustable layer when activation by ambient light insufficient. For example, in case the pilot is not comfortable with induced light transmission levels, the pilot can control the light transmission via controller 106 and UV radiation source 104 (i.e., via a user interface coupled controller 106). Alternatively, controller 106 can further activate the adjustable layer according to other conditions, such as data the time of day (day/night), the weather temperature, precipitation, cloudiness), background of outside scene (e.g., a bright desert sand or a dark forest), and the like. Controller 106 receives data respective of such conditions from external systems, such as the navigation systems of the aircraft, meteorological systems of the aircraft and other sensory systems of the aircraft.

Controller 106 monitors the luminosity levels within the HMD FOV (via LOS sensor 108 and luminosity sensor 110). Controller 186 can also monitor the light transmission level of the adjustable layer. For example, controller 106 can determine the light transmission by calculating it according to the measured luminosity levels. Alternatively, HMD system 100 can include an additional luminosity sensor located behind the adjustable layer, and controller 106 can calculate the light transmission by comparing the readings of the two sensors. In case controller 106 determines that the transmission level of the adjustable layer does not correspond to the desired level, controller 106 operates UV radiation source 104 to further activate the adjustable layer to induce the desired light transmission level.

It is noted that the adjustable layer be activated by other pairs of visible and UV activation wavebands. Alternatively, visor 102 includes two overlapping adjustable light transmission layers, one activated by a visible waveband, and the other by a UV waveband. Thereby, the light transmission of visor 102 can be automatically and uncontrollably adjusted by ambient light penetrating the cockpit, and can be further activated by the UV radiation source according to instructions of controller 106 or of the user.

Figure 2:
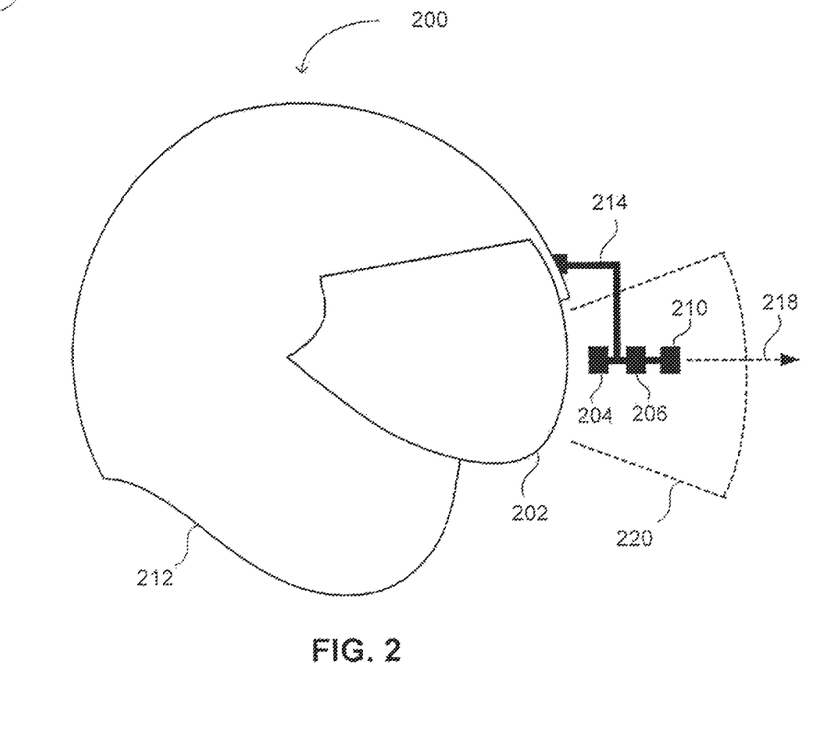
FIG. 2 is a schematic illustration of an adjustable light transmission HMD system depicted from a side view, constructed and operative in accordance with another embodiment of the disclosed technique.

Reference is now made to FIG. 2, which is a schematic illustration of an adjustable light transmission HMD system, generally referenced 200, constructed and operative in accordance with another embodiment of the disclosed technique. HMD system 200 includes a visor 202, a UV radiation source 204, a controller 206, a luminosity sensor 210, a helmet 212 and a support arm 214. Each of visor 202, UV radiation source 204, controller 206 and luminosity sensor 210 is substantially similar is construction and operation to visor 102, UV radiation source 104, controller 106 and luminosity sensor 110, of FIG. 1.

The components of HMD system 200 are mounted on a helmet 212, via a support arm 214 (or via another support mechanism 214). UV radiation source 204 and luminosity sensor 210 are mechanically aligned with a LOS 218 and with a FOV 220 of helmet 212 by being connected to helmet 212 via support arm 214. Therefore, a LOS sensor can be omitted from HMD system 200. Alternatively, in case at least one of UV radiation source 204 and luminosity sensor 210 is mounted on helmet 212, and aligned therewith, HMD system 200 further includes a LOS sensor for determining LOS 218, and thereby, FOV 220 of helmet 212.

Controller 206 determines the desired luminosity level for visor 202. Accordingly, controller 206 operates UV radiation source 204 to induce the desired luminosity level in the adjustable layer (not shown) of visor 202. It is noted that the adjustable layer can either be activated only by UV radiation, or can be activated by UV radiation as well as by visible radiation. In the latter case (i.e., dual activation), the adjustable layer is automatically and uncontrollably activated by ambient light—without intervention of controller 206 or of the user. In case of a special need, controller 206 operates UV radiation source 204 to complement the activation of the adjustable layer by the ambient light to induce a desired light transmission in visor 202.

HMD system 200 can further include an image source mounted on arm 214. The image source projects an image towards the eyes of the pilot. The projected image is overlaid on the outside scene as seen through the visor.

In the example detailed herein above with reference to FIG. 2, the HMD system was mounted on a helmet of a pilot. Alternatively, HMD system can be any head mounted system and not necessarily a helmet mounted system. For instance, HMD system can be mounted on a strap, or a glasses-like frame.

Additionally in the example detailed herein above with reference to FIG. 2, the HMD systems was located within a cockpit of an aircraft. Alternatively, the HMD system can be employed in other environments. For example, the HMD system can be employed in other vehicles having UV attenuating windows, such as land or marine vehicles. The HMD system can be employed in stationary environments such in-door simulators within buildings (or rooms) having UV attenuating windows. Generally, HMD system can be employed within any UV attenuated environment, and can be mounted on the head of the user by any mounting means.

Further additionally, in the example detailed herein above with reference to FIG. 2, the HMD system has a front projection configuration, in which the UV radiation source and the image source are mounted outside the visor and are project light onto the external side of the visor. Alternatively, HMD system can be back projection system in which at least one of the UV radiation source and the image source is positioned on the inner side of the visor, and irradiate the inner side of the visor.

It is noted that the UV radiation source and the image source can be positioned on opposite sides of the visor. For example, the image source projects the image on the exterior side of the visor, and the UV radiation source irradiates the interior side of the visor. In this manner, the user is not irradiated with the UV activation radiation (i.e., as the visor not a reflecting visor).

Figure 3:
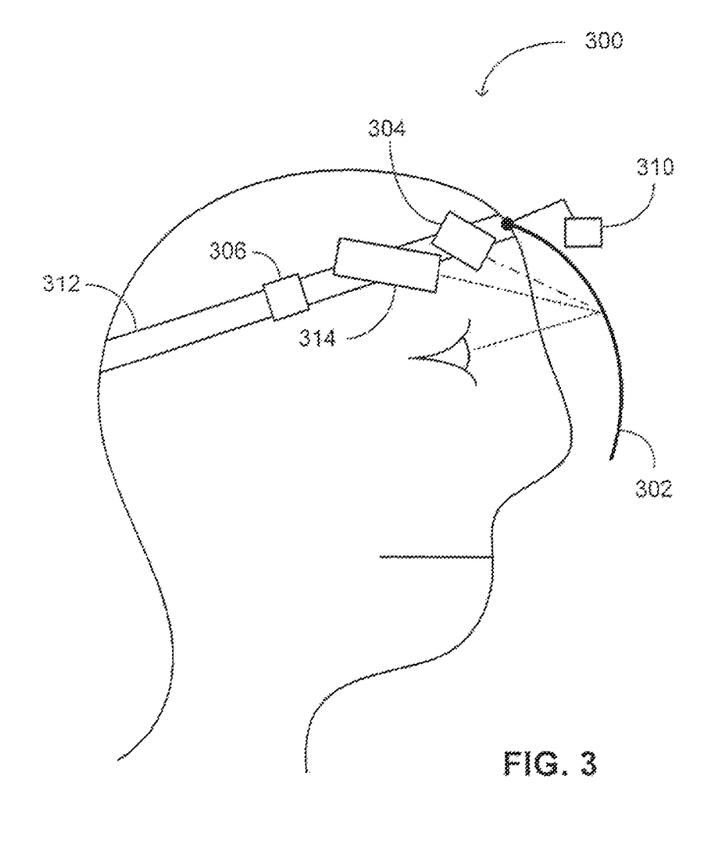
FIG. 3 is a schematic illustration of an adjustable light transmission HMD system, depicted from a side view, constructed and operative in accordance with a further embodiment of the disclosed technique

Reference is now made to FIG. 3, which is a schematic illustration of an adjustable light transmission HMD system, generally referenced 300, constructed and operative in accordance with another embodiment of the disclosed technique. HMD system 300 includes a visor 302, a UV radiation source 304, a luminosity sensor 310, a head strap 312 and an image source 314. HMD system further includes a controller (not shown) coupled with the other components of system 300 for controlling and coordinating their operation. Visor 302, UV source 304 and luminosity sensor 310 are mounted on head strap 312. Alternatively, head strap 312 can be replaced by any other head mount, such as an eyeglasses frame, a helmet, and the like.

Visor 302 includes (or is coupled with) an adjustable light transmission layer. Visor 302 (or at least a portion thereof) is a semi reflective visor that reflects a portion of the light irradiated onto and admits the other portion of the light. Thereby, visor 302 operates as an image combiner, combining an image projected onto its interior surface by image source 314 and the outside scene.

Image source 314 generates and projects an image onto visor 302. The generated image is, for example, a data image detailing data for the user. For instance, the data image can detail flight parameters, and other data indicative of the status of various systems of the aircrafts, or data detected by the sensory systems of the aircraft. At least a portion of the image is reflected by visor 302 toward the eye of the user (e.g., visor 302 back reflects half of the light intensity of the image). Additionally, visor 302 admits a portion of the outside scene (e.g., half of the light intensity of the outside scene). Thus, the user receives the outside scene overlaid by the image generated by image source 314.

UV radiation source 304 can adjust the light transmission of visor 302 by irradiating it with UV radiation. In accordance with an embodiment of the disclosed technique, the light of the outside scene also activates the adjustable layer of the visor (i.e., dual activation). In this case, the outside light automatically adjusts the light transmission of the adjustable layer, and in case that the controller (or the user) determines that further activation is required, UV radiation source is employed.

Luminosity sensor 310 determines the light luminosity levels of the outside scene image impinging on visor 302, and provides the measurements to the controller. The controller employs the measured luminosity levels for determining whether activation of the adjustable layer by UV source 310 is required. The controller can further receive other data for determining the desired light transmission level of the adjustable layer of the visor, such as the time of day, the weather conditions, the background of the outside scene, and the like.

The example detailed herein above with reference to FIG. 2 relates to a helmet. It is noted however, that the disclosed technique can be implemented by any HMD system, as exemplified in FIG. 3. Furthermore, the example set forth with reference to FIG. 2, relates to an external projection system, and that of FIG. 3 relates to an internal projection system. However, the disclosed technique can be implemented in any of the two configurations (i.e., internal and external projections). Alternatively, the disclosed technique can be implemented without an image source component at all (i.e., the user receives only the outside scene image without any image overlaid thereon).

Figure 4:
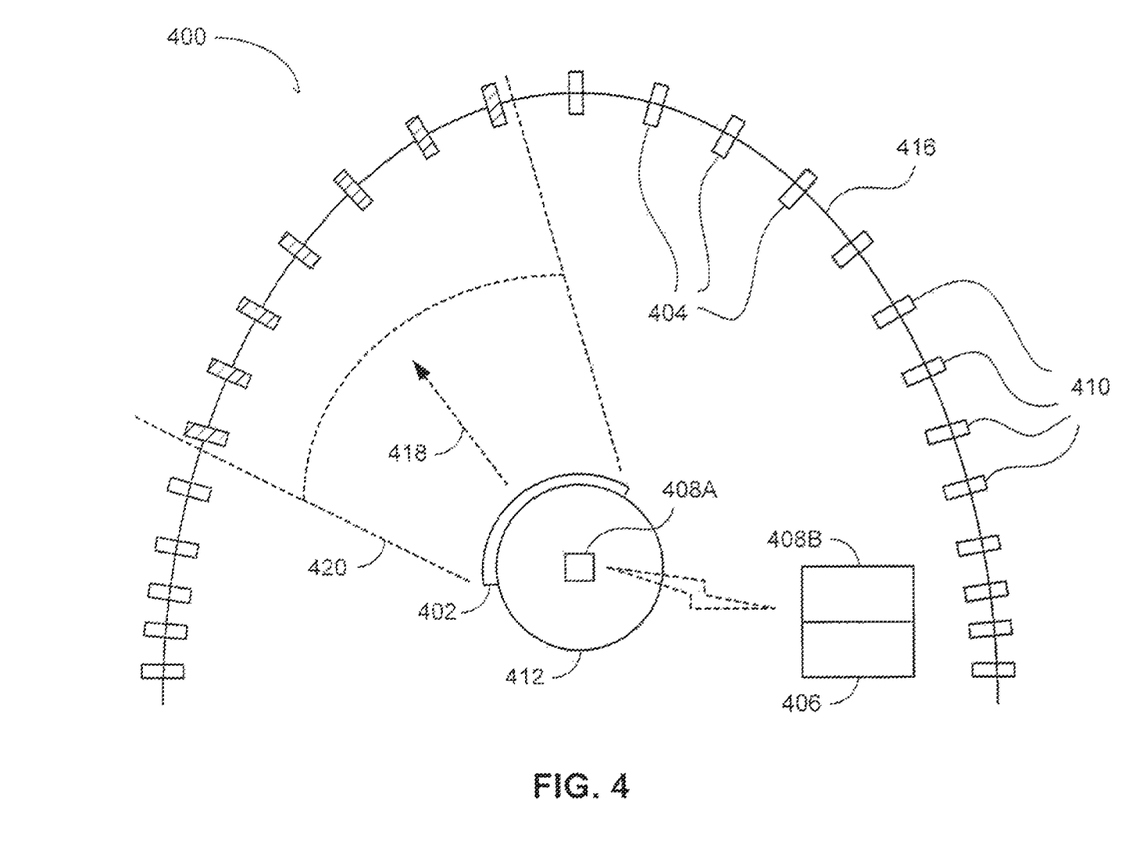
FIG. 4 is a schematic illustration of an adjustable light transmission HMD system, constructed and operative in accordance with yet another embodiment of the disclosed technique.

Reference is now made to FIG. 4, which is a schematic illustration of an adjustable light transmission HMD system, generally referenced 400, constructed and operative in accordance with a further embodiment of the disclosed technique. HMD system 400 includes a visor 40 of a HMD 412, a plurality of UV radiation sources 404, a controller 406, a LOS sensor HMD unit 408A, a LOS sensor cockpit unit 408B, and a plurality of luminosity sensors 410. HMD system 400 is installed within a cockpit having UV blocking windows 416.

Visor 402 includes an adjustable light transmission layer (not shown) which light transmission can be controlled by specific activation wavebands of electromagnetic radiation. UV radiation sources 404 produce UV radiation including activating wavelengths that activate the adjustable layer of visor 402. Controller 406 is coupled with the other components of HMD system 400 for controlling and coordinating the operation thereof. LOS HMD unit 408A is positioned on HMD 412 and is wirelessly connected to LOS cockpit unit 408B, for determining a LOS 418 of HMD 412. For example, the LOS sensor is an optical sensor, electromagnetic sensor, ultrasonic sensor, or any other sensor for determining LOS 418 of HMD 412, or the orientation of HMD 412. Luminosity sensors 410 measure luminosity levels within a respective FOV.

UV radiation source are spread across the cockpit of the aircraft (i.e., across the windows of the cockpit). Each of UV radiation sources 404 is paired with a respective one of luminosity sensors 410, such that both sit on the same axis facing opposite directions. In particular, the luminosity sensor of each pair faces the exterior environment surrounding the cockpit, and the radiation source faces the interior of the cockpit. In this manner, the UV radiation source of each pair can irradiate activation light at an intensity determined according to the measured ambient light (i.e., measured by the respective luminosity sensor). That is, the UV radiation sources can either be controlled by controller 406, or can be operated automatically according to the luminosity measured by the respective sensor, without intervention of controller 406.

Controller 406 is coupled with UV radiation sources 404, LOS sensor units 408A and 408B (or at least with one of the LOS sensor units), and with luminosity sensors 410. Controller 406 receives LOS 418 of HMD 412 from LOS sensor units 408A and 408B. Controller 406 determines according to LOS 418 a FOV 420 of HMD 412. Controller 406 operates luminosity sensors 410 located within FOV 420 (marked in FIG. 4 by diagonal lines for convenience of the viewer), for determining the luminosity of ambient light within FOV 420. Accordingly controller 406 determines a desired light transmission level for visor 402 (i.e., for the adjustable layer of visor 402).

In accordance with one embodiment of the disclosed technique, the adjustable layer is activated only by UV radiation. Controller 406 operates UV radiation sources 404 located within FOV 420 (marked in FIG. 4 by diagonal lines for convenience of the viewer), for irradiating visor 402, for adjusting the light transmission level of visor 402. Alternatively, controller 406 determines FOV 420, and operates those of luminosity sensors 410 that are within FOV 420. The UV radiation sources 404 within FOV 420 emit UV light according to the luminosity measured by the paired one of luminosity sensors 410. Further alternatively, HMD system 400 does not include a controller and a LOS sensor. Instead, each of UV radiation sources 404 emits UV light according to the luminosity measured by the respective luminosity sensor, regardless of the LOS of the HMD.

In accordance with another embodiment of the disclosed technique, the adjustable layer can be dually activated by a visible waveband, and by a UV waveband. The visible activating wavelengths, which are part of the ambient light, penetrate cockpit windows 416 and automatically and uncontrollably activate the adjustable layer. The adjustable layer of visor 402 is adapted to reach a predetermined desired level of light transmission via activation by ambient light. Controller 406 can further activate the adjustable layer (e.g., according to respective input of a pilot wearing HMD 412 via an input interface) by operating UV radiation sources 404.

Figure 5:
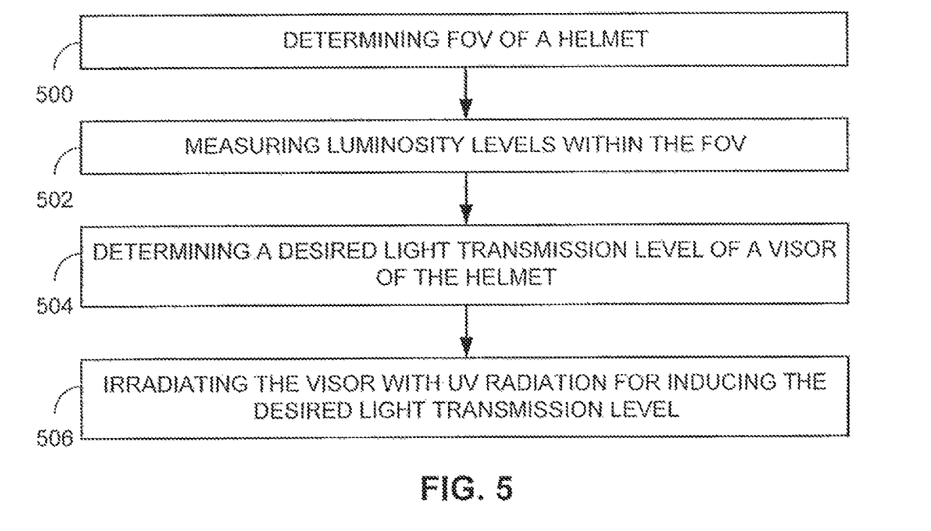
FIG. 5 is a schematic illustration of a method for controlling the light transmission of a visor of a HMD system, operative in accordance with yet a further embodiment of the disclosed technique.

Reference is now made to FIG. 5, which is a schematic illustration of a method for controlling the light transmission of a visor of a HMD system, operative in accordance with yet another embodiment of the disclosed technique. In procedure 500, a Field of View (FOV) of a HMD is determined. The FOV can be determined according to a Line of Site (LOS) of the HMD, which is determined by a LOS sensor. For example, the LOS sensor can be an optical sensor, an electromagnetic sensor or an ultrasonic sensor for determining the orientation of the HMD. It is noted that in case the components of a HMD system are installed on the HMD, and are mechanically aligned with the FOV of the HMD, procedure 500 may be omitted from the method. With reference to FIG. 1, LOS sensor 108 determines the LOS of the HMD. Accordingly, controller 106 determines the FOV of the HMD.

In procedure 502, the luminosity levels within the FOV of the HMD are measured. The luminosity is measured by a luminosity sensor or sensors. The measured luminosity can be limited to selected wavebands (e.g., measuring only visible light luminosity, or measuring some wavebands within the UV and IR spectrums as well as the luminosity of visible light). With reference to FIG. 1, controller 106 operates luminosity sensor 110 for determining the luminosity within the FOV of the HMD.

In procedure 504, a desired light transmission level of a visor of the HMD is determined. The desired light transmission level is determined according to the measured luminosity within the FOV of the HMD, for example, to prevent blinding of the pilot by bright ambient light. It is noted that different pilots might have different desired light transmission levels, and thud the HMD system can be calibrated for each pilot. Additionally, the desired light transmission levels can be affected by other conditions, such as weather conditions (clear or cloudy sky, raining or snowing conditions), the day/night cycle and the angle of the sun, the background of the outside scene (e.g., a white building, a bright desert sand or a dark forest), and the like. With reference to FIG. 1, controller 106 determines a desired light transmission level of visor 102 according to the measured luminosity within the FOV of the HMD.

In procedure 506, the visor of the HMD is irradiated with UV radiation for inducing the desired light transmission level. The visor of the HMD includes an adjustable light transmission layer, which light transmission properties can be adjusted and controlled. For example, the visor includes a photochromic layer activated by UV light. It is noted that only a selected area (or areas) of the visor includes the adjustable layer (i.e., an adjustable patch or patches). The adjustable layer (or patch) is irradiated with activating radiation to induce the desired light transmission levels in the visor. Alternatively, the adjustable layer covers the entire surface of the visor. With reference to FIG. 1, controller 106 operates UV radiation source 104 to activate the adjustable layer of visor 102, thereby controlling the light transmission properties of visor 102. It is noted that the HMD system is installed within a cockpit, which usually includes UV blocking windows, such that the interior of the cockpit can be considered as a UV-free environment.

Figure 6:
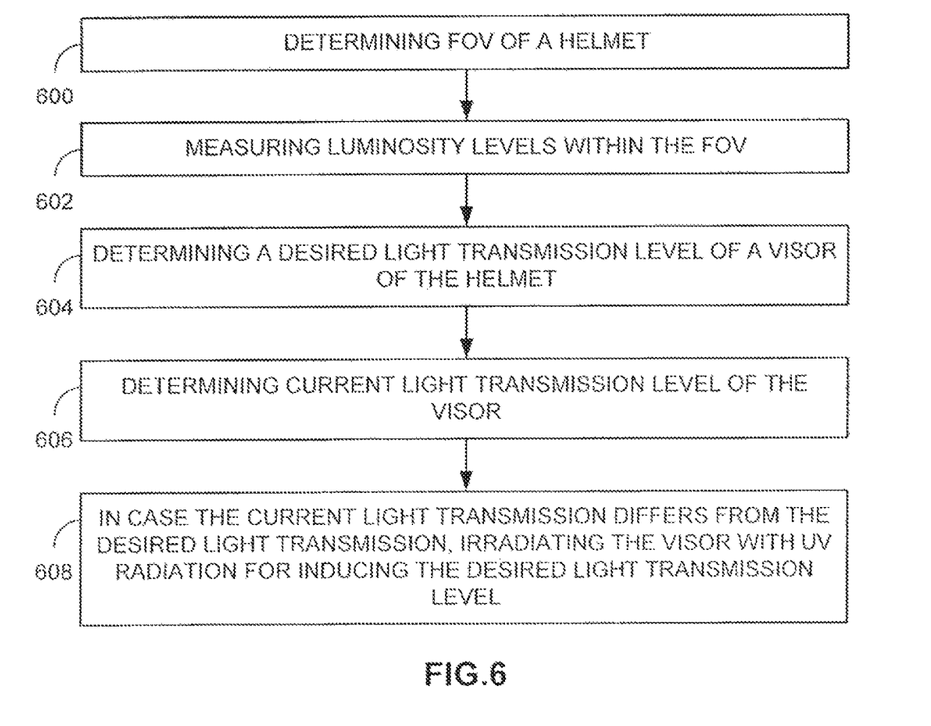
FIG. 6 is a schematic illustration of a method for controlling the light transmission of a visor of a HMD system, operative in accordance with yet another embodiment of the disclosed technique.

Reference is now made to FIG. 6, which is a schematic illustration of a method for controlling the light transmission of a visor of a HMD system, operative in accordance with yet a further embodiment of the disclosed technique. Procedures 600, 602 and 604 of the method are substantially similar to procedure 500, 502 and 504, of the method FIG. 5, respectively. However, the adjustable layer of the visor of a HMD system controlled according to the method of FIG. 5 is activated solely by UV radiation, while the adjustable layer of the visor of a HMD system controlled according to the method of FIG. 6 can be dually activated by both a visible waveband and a UV waveband. For example, the photochromic layer is activated by a waveband located on the border between the visible spectrum and the UV spectrum, such that portion of the activating wavelengths are visible (e.g., deep blue wavelengths) and a portion of the activating wavelengths are UV (e.g., near-UV wavelengths). In this manner, the visible activating wavelengths that are a part of the ambient light and that penetrate the cockpit windows irradiate the visor, and activate the adjustable layer. The adjustable layer is adapted to reach a predetermined level of light transmission in response to the visible activating ambient light. Thus, the light transmission of the visor is automatically and uncontrollably activated without intervention of the controller of the HMD system, or of the pilot.

In procedure 606, current light transmission level of the visor of the HMD is determined. The current light transmission level can be calculated according to the measured luminosity levels within the FOV of the HMD as measured in procedure 602. That is, by knowing the intensity of the activating visible light, and knowing the operational characteristics of the adjustable layer, the induced light transmission levels can be calculated. Alternatively, the current light transmission can be measured by employing a luminosity sensor positioned behind the visor, and measuring the luminosity levels that penetrate the visor. The luminosity levels in front of the visor and behind the visor are compared and the light transmission can thus be determined. Additionally, the desired light transmission levels can be affected by other conditions, such as weather conditions (clear or cloudy sky, raining or snowing conditions), the day/night cycle and the angle of the sun, the background of the outside scene (e.g., a white building, a bright desert sand or a dark forest), and the like. With reference to FIG. 1, controller 106 determines a desired light transmission level of visor 102 according to the measured luminosity within the FOV of the HMD.

In procedure 608, in case the current light transmission of the visor of the HMD differs from the desired light transmission, the visor is irradiated with UV radiation for inducing the desired light transmission level. In this manner, the HMD system can complement the ambient light activation of the adjustable layer of the visor with UV activation for inducing the desired light transmission. It is noted that the desired light transmission might differ from the predetermined desired light transmission, employed for producing the adjustable layer, and therefore the UV activation is required to complement the ambient light activation. For example, in case the pilot wants the further shade the visor, the pilot provides respective input to the controller of the HMD system via an input interface. The controller operates the UV radiation source for activating the adjustable layer, thereby controlling the light transmission of the visor. With reference to FIG. 1, controller 106 operates UV radiation source 104 for controlling the light transmission of visor 102.

It will be appreciated by persons skilled in the art that the disclosed technique is not limited to what has been particularly shown and described hereinabove. Rather the scope of the disclosed technique is defined only by the claims, which follow.

The invention claimed is:

1. A HMD system comprising:
   a visor mounted on a head of a user, said visor including an adjustable light transmission layer activated by activation radiation including at least a visible activation waveband and an Ultra Violet (UV) activation waveband, said visor defining a Line Of sight (LOS) projecting from a point on said visor, said visor defining a Field Of View (FOV) associated with said LOS and projecting from at least a section of said visor that surrounds said point on said visor, said visor configured to admit an outside scene image, said FOV covering only a portion of the entire scene available to the user;
   a luminosity sensor configured to detect luminosity within said FOV, thereby providing luminosity measurement associated with said LOS of said visor mounted on said head of said user; and
   a UV activation radiation source configured to selectively irradiate at least a portion of said visor with activation UV light included in said UV activation waveband according to luminosity measurement associated with said LOS of said visor mounted on said head of said user detected by said luminosity sensor, thereby activating said adjustable light transmission layer;
   wherein, said HMD system being located in a UV-attenuated environment such that said adjustable light transmission layer being activated by activation ambient light in said visible activation waveband, and can further be activated by activation UV light emitted from said UV activation radiation source.

2. The HMD system of claim 1, further comprising a controller coupled with said luminosity sensor and with said UV activation radiation source, said controller configured to receive luminosity measurement associated with said LOS of said visor mounted on said head of said user detected by said luminosity sensor, to determine a desired light transmission level for said visor for said LOS, and to operate said UV activation radiation source for inducing said desired light transmission level.

3. The HMD system of claim 2, further comprising a Line of Site (LOS) sensor coupled with said controller, said LOS sensor configured to determine said LOS defined by said visor, said controller configured to determining said FOV defined by said visor according to said LOS, said controller configured to operate said luminosity sensor to measure luminosity in said FOV.

4. The HMD system of claim 2, wherein said controller is configured to determine said desired light transmission level of said visor at least according to luminosity measurement associated with said LOS of said visor mounted on said head of said user measured by said luminosity sensor.

5. The HMD system of claim 4, wherein said controller is configured to determine said desired light transmission level further according to at least one of the list consisting of:
   an input from a user;
   the time of day;
   the angle of the sun;
   the weather conditions; and
   a background of an outside scene.

6. The HMD system of claim 1, further comprising an image source configured to generate a data image and to project said data image onto said visor.

7. The HMD system of claim 6, wherein said image source is configured to project said data image onto an interior side of said visor, and wherein said visor being a semi-reflecting visor configured to reflect said data image and to admit said outside scene image.

8. The HMD system of claim 6, wherein said image source is configured to project said data image onto an exterior side of said visor, and wherein said visor is configured to admit said data image and said outside scene image.

9. The HMD system of claim 1, wherein said UV activation radiation source is configured to irradiate an interior side of said visor.

10. The HMD system of claim 1, wherein said UV activation radiation source is configured to irradiate an exterior side of said visor.

11. The HMD system of claim 1, wherein said luminosity sensor consists of a plurality of luminosity sensors and wherein said UV radiation activation source consists of a plurality of radiation sources, each of said radiation sources being associated with a respective one of said luminosity sensors and is positioned on an axis of said respective one of said luminosity sensors facing opposite directions,
- wherein said plurality of luminosity sensors and said plurality of radiation sources are spread across said UV attenuated environment, and
- wherein a selected one of plurality of radiation sources is configured to irradiate activation radiation according to luminosity detected by a respective one of said plurality of luminosity sensors and associated with said LOS.

12. The HMD system of claim 1, further comprising a LOS sensor and a controller, wherein said controller is configured to determine said LOS of said visor according to LOS readings of said LOS sensor, and wherein said controller is configured to operate selected ones of said plurality of luminosity sensors and of said plurality of radiation sources according to said LOS of said visor.

13. A method for operating an HMD system, comprising the following procedures:
- determining an FOV defined by a visor of said HMD system and associated with the Line-Of-Sight (LOS) of a user, said FOV covering only a portion of the scene available to said user;
- measuring luminosity within said FOV by employing a luminosity sensor, thereby providing a LOS associated luminosity measurement;
- determining whether said LOS associated luminosity measurement, measured within said FOV, exceeds a desired light transmission level of said visor; and
- irradiating said visor with UV radiation for adjusting the light transmission layer.

14. The method of claim 13, further comprising the procedure of determining current light transmission level of said visor, and wherein said procedure of irradiating said visor with UV radiation being performed according to a difference between said current light transmission level and said desired light transmission level.

* * * * *